(12) United States Patent
Tanikella et al.

(10) Patent No.: US 10,650,009 B2
(45) Date of Patent: May 12, 2020

(54) GENERATING NEWS HEADLINES ON ONLINE SOCIAL NETWORKS

(71) Applicant: Facebook, Inc., Menlo Park, CA (US)

(72) Inventors: Soorya Vamsi Mohan Tanikella, Redmond, WA (US); Li-Tal Mashiach, Redmond, WA (US); Ivan Mazepov, Seattle, WA (US); Apurva Sinha, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 363 days.

(21) Appl. No.: 15/359,431

(22) Filed: Nov. 22, 2016

(65) Prior Publication Data

US 2018/0143980 A1    May 24, 2018

(51) Int. Cl.
*G06F 16/2457* (2019.01)
*G06F 16/28* (2019.01)
*G06F 16/9535* (2019.01)
*G06Q 10/10* (2012.01)
*G06Q 50/00* (2012.01)
*G06Q 30/02* (2012.01)
*H04L 29/08* (2006.01)

(52) U.S. Cl.
CPC ...... *G06F 16/24578* (2019.01); *G06F 16/285* (2019.01); *G06F 16/9535* (2019.01); *G06Q 10/10* (2013.01); *G06Q 30/0241* (2013.01); *G06Q 50/01* (2013.01); *H04L 67/18* (2013.01)

(58) Field of Classification Search
CPC ..... H04L 67/18; H04L 51/32; G06F 17/3084; G06F 17/30867; G06F 17/30; G06F 16/7867; G06F 16/9535; G06F 16/285; G06F 16/24578
See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |

(Continued)

*Primary Examiner* — Shahid A Alam
(74) *Attorney, Agent, or Firm* — Jordan IP Law, LLC

(57) ABSTRACT

In one embodiment, a method includes identifying a trending topic on an online social network, accessing a plurality of content objects posted to the online social network, wherein each content object is associated with the trending topic, and categorizing each content object into clusters based on a natural-language analysis of the content objects. The method may further include calculating a quality score for each cluster, wherein the quality score for each cluster is based at least on a measure of recency of one or more publication dates of the content objects within the cluster, select the cluster with the highest quality score as a trending cluster, and generating a trending-topic interface that includes a headline and description of the trending topic, wherein the headline and description are extracted from one or more of the content objects within the trending cluster.

19 Claims, 7 Drawing Sheets

(56) References Cited

U.S. PATENT DOCUMENTS

| | | |
|---|---|---|
| 7,840,589 B1 | 11/2010 | Holt |
| 8,024,328 B2 | 9/2011 | Dolin |
| 8,027,990 B1 | 9/2011 | Mysen |
| 8,032,533 B1* | 10/2011 | Spencer ............... G06Q 50/18 705/311 |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0082505 A1* | 4/2008 | Kokubu ............... G06F 16/3332 707/769 |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0093464 A1* | 4/2011 | Cvet ................... G06F 16/355 707/737 |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |

(56) References Cited

U.S. PATENT DOCUMENTS

| | | |
|---|---|---|
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2013/0311301 A1* | 11/2013 | Grant ................. G06Q 30/0273 |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0154308 A1* | 6/2015 | Hagg ...................... G06F 16/34 707/722 |
| 2015/0161519 A1 | 6/2015 | Zhong |
| 2015/0242486 A1* | 8/2015 | Chari ................... G06F 16/285 707/737 |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2016/0232241 A1* | 8/2016 | Stoyanov .......... G06F 17/30867 |
| 2016/0239558 A1* | 8/2016 | Borenstein ............. G06F 17/30 |
| 2016/0359791 A1* | 12/2016 | Zhang .................... H04L 67/18 |
| 2018/0101540 A1* | 4/2018 | Stoop ................. G06F 17/3084 |

* cited by examiner

GENERATING NEWS HEADLINES ON ONLINE SOCIAL NETWORKS

TECHNICAL FIELD

This disclosure generally relates to providing content related to a trending topic on an online social networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may automatically generate a trending-topic interface for a trending topic on an online social network. The trending-topic interface may comprise a headline and a description of a sub-topic related to the trending topic. To generate the headline and description algorithmically (e.g., without human curation), the social-networking system may identify a plurality of content objects (e.g., articles, videos, user-generated posts) that are related to the trending topic. The social-networking system may cluster the identified content objects by categorizing each content object into one of a plurality of clusters. Each cluster may relate to a particular sub-topic, and each sub-topic may relate to the trending topic. Sub-topics may be related to events that have occurred in the recent past (e.g., within a threshold timeframe) and may be associated with several content objects that have been posted to the online social network by users, third-party media providers (e.g., news publications, media networks), and other entities. Once the social-networking system has categorized the content objects into the plurality of clusters, the social-networking system may calculate a quality score for each cluster. The quality score for a particular cluster may be based on a number of factors, including how recently the content objects in that cluster have been published, the number of content objects in the cluster, the coherence of content objects within the cluster, the relevancy of the content objects within the cluster to the trending topic as calculated by a vector-space model, and other factors. The cluster with the highest quality score may be identified as a trending cluster. The social-networking system may analyze the content objects within the trending cluster to select a headline, description, and one or more images for the trending-topic interface.

As an example and not by way of limitation, the social-networking system may identify content objects related to the trending topic "Bryce Harper," who is a Major League Baseball player. By analyzing the content objects, the social-networking system may identify three clusters, each associated with one of the following sub-topics: "Bryce Harper is selected as the unanimous MVP," "Bryce Harper gives his bat to a young fan," and "Bryce Harper takes a selfie." The social-networking system may categorize each content object into one of the three clusters. The social-networking system may calculate a quality score for each of the clusters according to the factors mentioned above. The cluster associated with the sub-topic, "Bryce Harper is selected as the unanimous MVP" may have the highest quality score, and may be selected as the trending cluster. The social-networking system may then analyze the content objects in the trending cluster and select a headline, description, and image from among the content objects in the trending cluster to display in the trending-topic interface.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
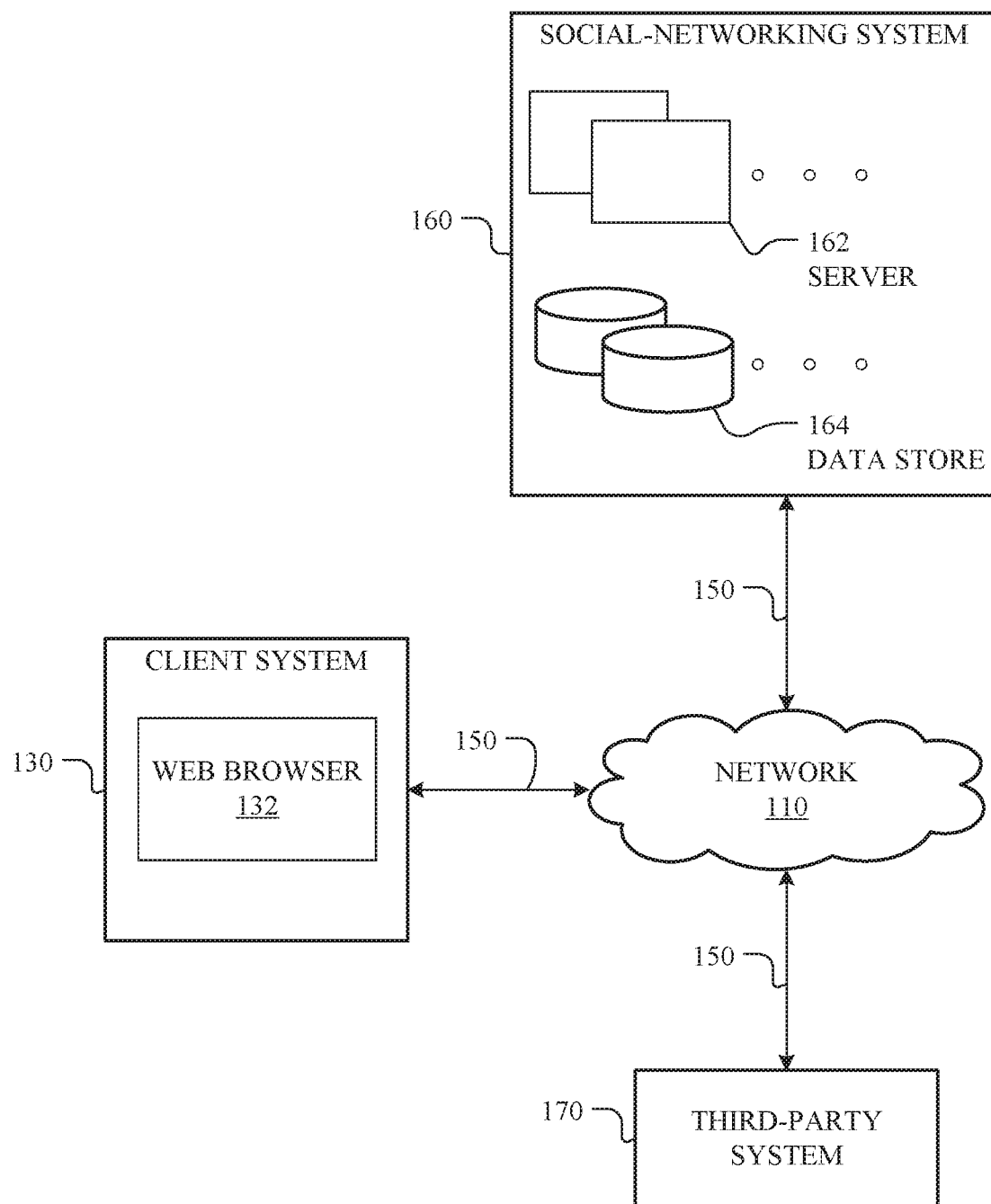
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
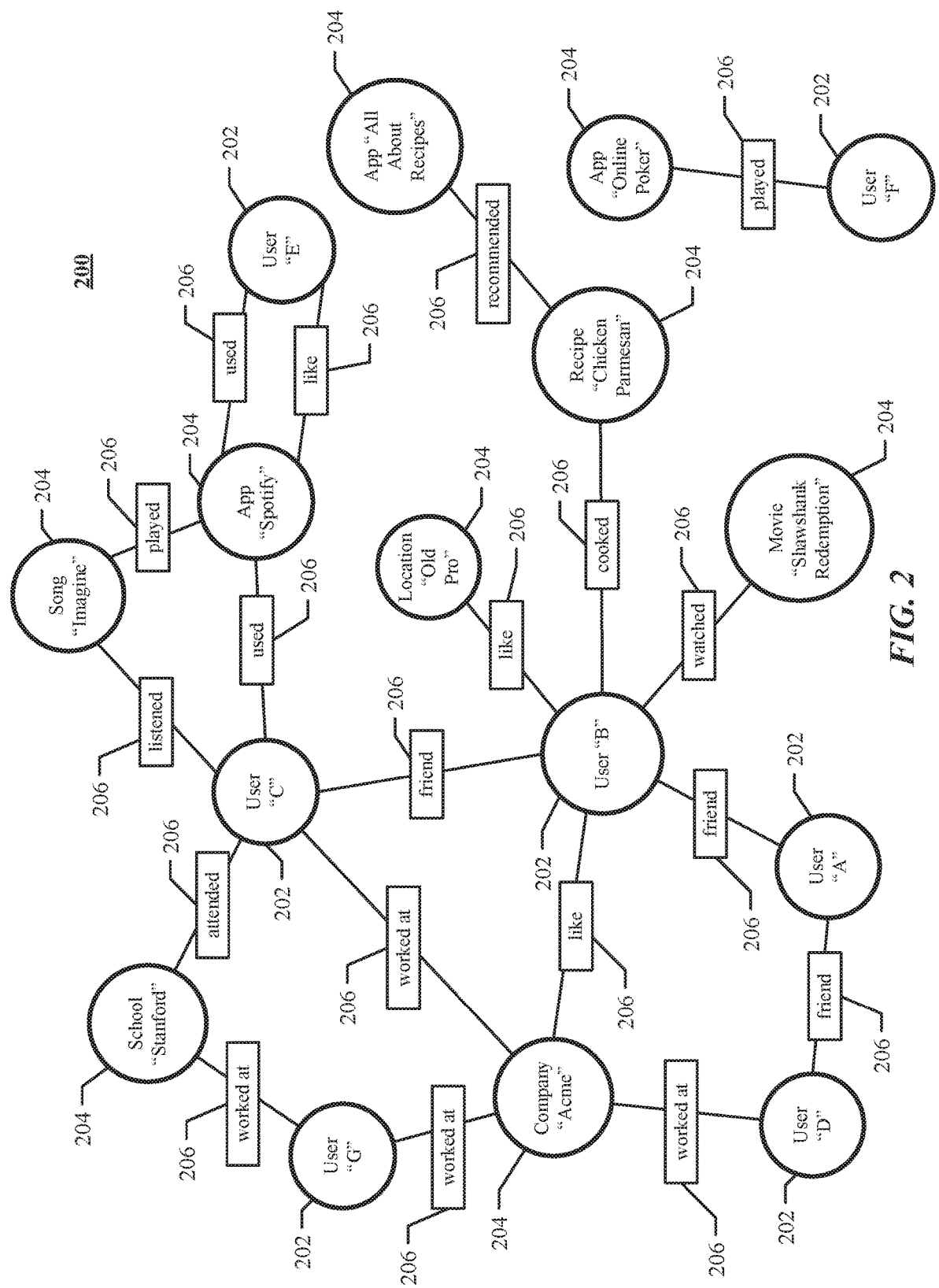
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Generating Trending-Topic Interfaces

In particular embodiments, the social-networking system 160 may generate a trending-topic interface for a trending topic on the online social network. The social-networking system 160 may generate the trending-topic interface by identifying content objects related to the trending topic; categorize each of the identified content objects into one of a plurality of clusters, wherein each cluster relates to a particular sub-topic that is in turn related to the trending topic; calculate a quality score for each cluster; identify the cluster with the highest quality score as a trending cluster; and analyze the content objects in the trending cluster as well as user interaction with the content objects in the trending cluster to select a headline, description, and one or more images for the trending-topic interface. Although this disclosure describes generating a trending-topic interface in a particular manner, this disclosure contemplates generating a trending-topic interface in any suitable manner.

In particular embodiments, the social-networking system 160 may identify a trending topic on an online social network. In particular embodiments, the social-networking system 160 may use a trending algorithm (e.g., an algorithm defined by a given platform based on its needs) to identify content that exhibits an uptick (e.g., increase) in activity that may be related to particular people, places, events, or other topics. The trending topic may be an existing topic, a new topic, two or more co-occurring topics, or a group of topics. A topic may refer to a title, description, name, or any other suitable descriptor or identifier corresponding to a particular event or subject matter. As an example and not by way of limitation, a trending topic may refer to a news event (e.g., the solidarity march in Paris in January 2015), a political event (e.g., the 2016 United States presidential election), a sporting event (e.g., the 2014 World Cup Tournament), an organization (e.g., the Nobel Peace Prize nominating committee), a place (e.g., Yosemite National Park), a person (e.g., Bryce Harper), a product (e.g., iPhone 7), or a restaurant (e.g., Sancho's Taqueria), or any other type of suitable event or subject matter. As an example and not by way of limitation, the identified content may be determined from posts associated with (e.g., authored by, liked by, reshared by, commented on by, or viewed by) friends or groups of the user and that are related to a particular topic (e.g., a trending topic) on the online social network. The posts may be posted by users of the online social network, which may include individuals, media organizations, groups, or any other suitable entity. More information on trending topics may be found in U.S. patent application Ser. No. 14/858,366, filed 18 Sep. 2015, which is incorporated by reference. Although this disclosure describes identifying particular trending topics in a particular manner, this disclosure contemplates identifying any suitable trending topics in any suitable manner.

In particular embodiments, a trending topic may be associated with one or more sub-topics. A sub-topic may be a topic that forms part of a larger trending topic. A sub-topic may be an event that has occurred in relation to the trending topic, an idea related to the trending topic, or any other suitable sub-topic. As an example and not by way of limitation, the social-networking system 160 may identify "Bryce Harper" (a Major League Baseball player for the Washington Nationals) as a trending topic on the online social network. Sub-topics associated with the trending topic "Bryce Harper" may include "Bryce Harper is selected as the unanimous MVP," "Bryce Harper gives his bat to a young fan," and "Bryce Harper takes a selfie." Another example of a sub-topic of Bryce Harper may be an op-ed article expressing an opinion about the star athlete. Although this disclosure describes particular sub-topics in a particular manner, this disclosure contemplates any suitable manner of sub-topics.

In particular embodiments, the social-networking system 160 may access a plurality of content objects posted to the online social network, wherein each content object is associated with the trending topic. In addition to what has been discussed herein, content objects may include user-generated posts, comments to posts, articles that have been posted to the online social network, images, videos, or any other suitable type of content. As an example and not by way of limitation, the social-networking system 160 may identify "Bryce Harper" as a trending topic. The social-networking system 160 may identify several content objects about Bryce Harper. These content objects may include news articles, photos, and videos from various sports reporting stations (e.g., ESPN, FOX SPORTS), entities (e.g., the MLB, the WASHINGTON NATIONALS), or individual users of the online social network (e.g., a user may post a photo of Bryce Harper that has the caption "Bryce Harper—MVP of the National League"). As another example and not by way of limitation, the social-networking system 160 may identify as a trending topic the 2016 Olympic Games in Rio de Janeiro, Brazil. The social-networking system 160 may identify several content objects about the 2016 Olympics in Rio. These content objects may include news articles, photos, and videos from various sports reporting stations (e.g., NBC SPORTS, ESPN), articles, photos, and videos from various entities (e.g., the International Olympic Committee); or posts, photos, and videos from individual users of the online social network (e.g., a user may post a photo of Allyson Felix that has the caption "Let's Go Allyson! Get gold in the 400!"). In particular embodiments, the social-networking system 160 may access only the content objects that have been posted to the online social network within a threshold timeframe. As an example and not by way of limitation, the social-networking system 160 may only access content objects that have been posted to the online social network in the last two weeks, two days, or any other suitable timeframe. This timeframe may be determined by an administrator or by the social-networking system 160 itself based on one or more machine-learning algorithms that seek to increase user engagement with the online social network generally and the trending-topic interface specifically. Although this disclosure describes accessing a plurality of content objects posted to the online social network in a particular manner, this disclosure contemplates accessing a plurality of content objects posted to the online social network in any suitable manner.

Figure 3:
FIG. 3 illustrates an example user interface with a trending module.

FIG. 3 illustrates an example user interface 300 with trending module 310. The trending module 310 may include one or more trending topics 311 that are each associated with a headline 312 for the trending topic. A user of the social-networking system 160 may interact with the trending module 310 by selecting a particular trending topic 311 or headline 312 for the trending topic. In response to the user's selection of a particular trending topic 311 or headline 312, the social-networking system 160 may display trending-topic interface including one or more content objects related to the trending topic or one or more references to content objects related to the trending topic. As an example and not by way of limitation, a first trending topic 311 may state "Bryce Harper" and a first headline for the trending topic of "Bryce Harper" may state "Selected as unanimous MVP." By clicking on either of these elements, the user may prompt the display of one or more content objects related to Bryce Harper being selected as the unanimous MVP. As another example and not by way of limitation, a second trending topic 311 may state "Maria Sharapova," and a second headline 312 for the trending topic may state "pro tennis player calls press conference to make 'major announcement.' By clicking on either of these elements, the user may prompt the display of one or more content objects related to Maria Sharapova's major announcement.

In particular embodiments, when a user selects a trending topic 311 (e.g., "Maria Sharapova"), the social-networking system 160 may treat the selection as a query. The query may be received by a top aggregator, which may access a web index that indexes all or a portion of pages shared across the online social network. Pages that substantially match the query may be sent to the top aggregator as search results, along with static (e.g., default) rankings of the search results. More information about web indexes may be found in U.S. application Ser. No. 14/341,148, filed 25 Jul. 2014, and U.S. application Ser. No. 14/640,431, filed 6 Mar. 2015, which are incorporated herein by reference. The top aggregator or a separate service, such as a news-event post-processor, may categorize articles according to their subject matter, as will be discussed below. More information on news-event post-processing may be found in U.S. application Ser. No. 14/616,155, filed 6 Feb. 2015.

Figure 4B:
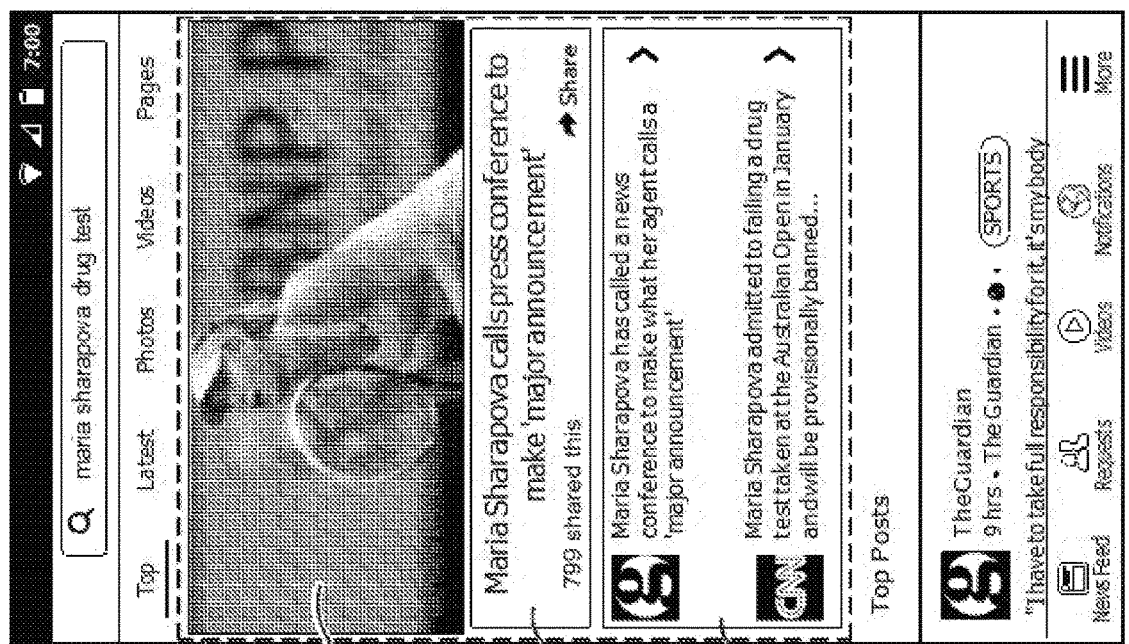
FIG. 4B illustrates an example context module with a trending-topic interface.
Figure 4A:
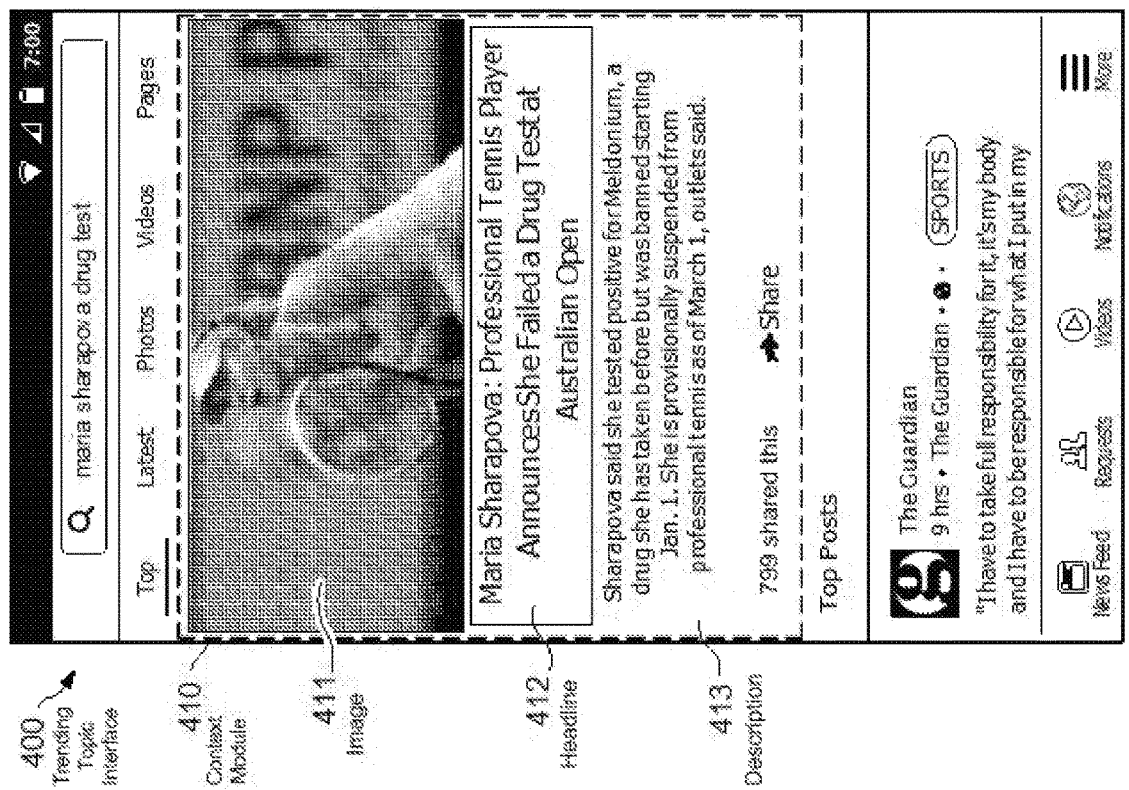
FIG. 4A illustrates an example trending-topic interface with an example content module.

FIGS. 4A and 4B illustrate an example trending-topic interface 400 with an example context module 410. The context module 410 may include an image 411, headline 412, and description 413. The context module 410 may provide information related to a particular sub-topic that is associated with a particular trending topic. As an example and not by way of limitation, the context module 410 may provide information related to the sub-topic "Maria Sharapova failing a drug test," which may be associated with the broader trending topic of "Maria Sharapova" (a professional tennis player). With reference to FIG. 4A, the headline 412 may state, "Maria Sharapova: Professional Tennis Player Announces She Failed a Drug Test at Australian Open." The description 413 may provide a more detailed discussion of the sub-topic about Maria Sharapova. The social-networking system 160 may have extracted the headline 412 and the description 413 from a content object posted to the online social network, as will be explained herein. In contrast to FIG. 4A, FIG. 4B illustrates an alternate format for presenting information related to a particular sub-topic. Instead of the description comprising plain text, the description 413 of FIG. 4B comprises descriptions from two media organizations. The user may select either description, and may be able to view content from the particular news organization that she selected. As an example and not by way of limitation, if a user selects the CNN description, she may view a news article published by CNN related to Maria Sharapova's failed drug test. Although this disclosure describes displaying particular trending-topic interfaces in a particular manner, this disclosure contemplates displaying any suitable trending-topic interfaces in any suitable manner.

In particular embodiments, the social-networking system 160 may categorize each content object associated with a particular trending topic into one of a plurality of discrete clusters based on a natural-language analysis of the respective content objects. As discussed previously, the trending topic may be associated with a plurality of sub-topics. Each cluster may relate to a different sub-topic of the plurality of sub-topics associated with the trending topic. In other words, a cluster may be a group of content objects that are all related to the same sub-topic. Each cluster may be discrete, meaning that no content object is categorized into more than one cluster. The social-networking system 160 may not identify particular sub-topics before categorizing each content object. Instead, the social-networking system 160 may categorize similar content objects together in the same cluster (which may be named or unnamed) based on a natural-language analysis, such as a term frequency-inverse document frequency (TF-IDF) analysis, word2vec analysis using cosine similarity, a combination of the two, or any suitable natural-language analysis. TF-IDF is a statistical measure used to evaluate how important a term is to a document (e.g., a post on the online social network) in a collection or corpus (e.g., a set of posts on the online social network). The less important a term is in the collection or corpus, the less likely it may be that the term will be extracted as an n-gram. The importance increases proportionally to the number of times a term appears in a particular document, but is offset by the frequency of the term in the corpus of documents. The importance of a term in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, a TF-IDF analysis of the text of the text string "Bryce Harper had a season for the ages in 2015, and he was rewarded for his hard work by being selected as the National League MVP" may determine that the n-grams "Bryce" "Harper" and "MVP" should be extracted as n-grams, among others, where these terms have high importance within the text string. Similarly, a TF-IDF analysis of the text in the search query may determine that the n-grams "by," "his," and "had," among others, should not be extracted as n-grams, where these terms have a low importance within the text string (e.g., because these are common terms in many posts/comments/articles on the online social network and therefore do not help narrow the set of search results in any significant manner). Based on this TF-IDF analysis, the social-networking system 160 may determine that the text string is related to "Bryce Harper MVP." As another example, a TF-IDF analysis of the text of the text string, "Bryce Harper takes a secret selfie with a young fan at the Smithsonian" may determine that the n-grams "Bryce," "Harper," "selfie," and "smithsonian" should be extracted as n-grams, among others, because these terms have high importance within the text string. Similarly, a TF-IDF analysis of the text in the text string may determine that the n-grams "takes," "with," and "fan," among others, should not be extracted as n-grams, where these terms have a low importance within the text string. Based on the TF-IDF analysis, the social-networking system 160 may determine that the above text string is related to "Bryce Harper Selfie." As the social-networking system 160 analyzes more content objects, it may categorize similar content objects (e.g., content objects related to "Bryce Harper MVP") into a similar cluster. There may be any number of clusters, and each cluster may include content objects that relate to a particular sub-topic or event (e.g., Bryce Harper takes a selfie, Bryce Harper wins MVP). More information on determining terms of low importance in text strings may be found in U.S. patent application Ser. No. 14/877,624, filed 7 Oct. 2015. Although this disclosure describes categorizing content objects in a particular manner, this disclosure contemplates categorizing content objects in any suitable manner.

Figure 5:
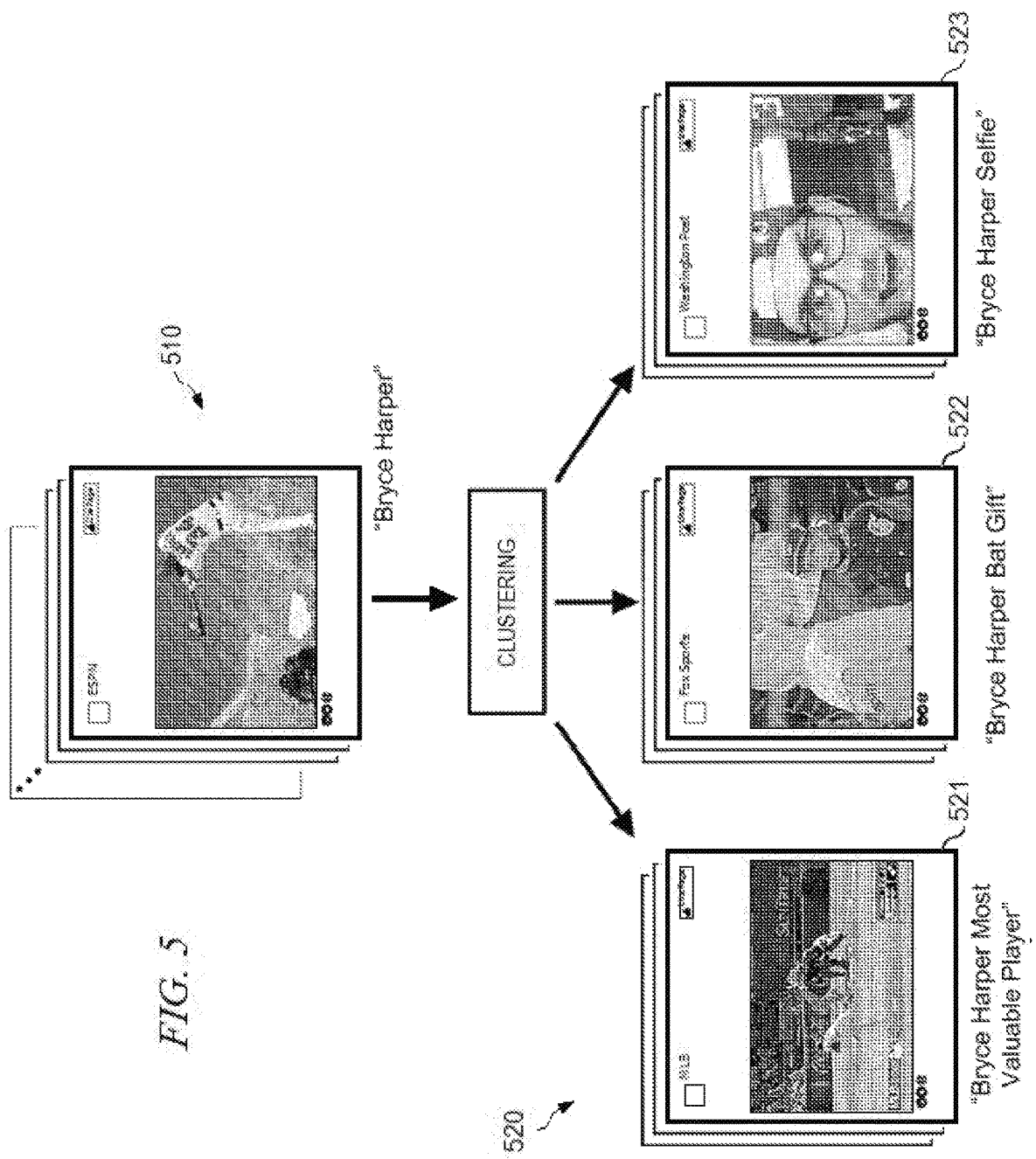
FIG. 5 illustrates an example visualization for categorizing content objects into clusters.

FIG. 5 illustrates an example visualization for categorizing content objects into clusters. The visualization may include uncategorized content objects 510 and a plurality of clusters 520. Uncategorized content objects 510 may include any number of content objects in any type of format (e.g., articles, images, videos, blog posts). Using the categorization techniques discussed above, the social-networking system 160 may "cluster" (e.g., categorize) uncategorized content objects 510 into a plurality of clusters 520. In the example of FIG. 5, clusters 520 may include "Most Valuable Player" cluster 521, "Bat Gift" cluster 522, and "Selfie" cluster 523. There may be any number of clusters 520 formed, and each cluster 520 may include any number of content objects. As an example and not by way of limitation, uncategorized content objects 510 that are related to Bryce Harper being the league's most valuable player may be categorized in "Most Valuable Player" cluster 521. Uncategorized content objects 510 that are related to Bryce Harper giving a bat to a young fan may be categorized in "Bat Gift" cluster 522. Uncategorized content objects 510 that are related to Bryce Harper taking a selfie with an unsuspecting fan may be categorized in "Selfie" cluster 523. Although this disclosure describes and illustrates categorizing particular content objects in a particular manner, this disclosure contemplates categorizing any suitable content objects in any suitable manner.

In particular embodiments, the social-networking system 160 may calculate a quality score for each cluster. The quality score for a particular cluster may be based on a number of factors, including how recently the content objects in that cluster have been published, the number of content objects in the cluster, the coherence of content objects within the cluster, the relevancy of the content objects within the cluster to the trending topic as calculated by a vector-space model, and other factors. The quality score for a particular cluster may be a measurement of how important the content objects within the cluster are to the trending topic, or how important users of the online social network find the content objects within the cluster to the trending topic, where a higher relative score for a particular object may indicate the object is more important/relevant. The goal of calculating a quality score for each cluster may be to identify the sub-topic that is most important to users of the online social network as it relates to its trending topic. Because each cluster may be associated with a particular sub-topic, the cluster with the highest quality score may be associated with a sub-topic that has a high likelihood of being important to users of the online social network. "Importance" may be expressed click-through data: a link to a sub-topic that has a high click-through rate may be considered to be important. In particular embodiments, an important sub-topic may be a sub-topic that users of the online social network are most likely to engage with by viewing, sharing, commenting on, or liking content objects within that cluster. In particular embodiments, the quality score for each cluster may be based at least on a measure of recency of one or more publication dates of the content objects within the cluster. Recency may be one factor in determining a cluster's quality score, because a trending topic may be time-sensitive. That is, a topic that is trending today may not be trending a day, a week, or a month from now. Thus, how recently the content objects within a particular cluster were published may affect the cluster's quality score, with more recently published content objects earning a higher quality score for their cluster than older published content objects. The social-networking system 160 may calculate the average publication date for content objects within each cluster, or may filter out content objects published before a particular date (e.g., 5 days ago). A publication date for a particular content object may be the date that the content object was originally posted to the online social network, or alternatively, the date when the content object first became publicly available. The original publication date of a content object may be extracted by the social-networking system from the text or metadata associated with the object. As an example and not by way of limitation, an article published by the New York Times to www.nytimes.com on 10 Sep. 2016 and posted to the online social network on 11 Sep. 2016 may have a publication date of 10 Sep. 2016. If the date of public availability is unavailable (e.g., an undated blog post), the publication date may be the date the content object was posted to the online social network. If the social-networking system 160 only considers the measure of recency in calculating the quality score for each cluster, an algorithm that the social-networking system 160 may use may be:

$$QS = \frac{1}{\text{Average days since publication}}$$

where QS stands for quality score, and Average clays since publication represents the average number of days that have passed between the publication of the content objects and the date when the quality score is calculated. As an example and not by way of limitation, a particular cluster may include three content objects published on October 1, September 29, and October 2. If the quality score is calculated on October 4, Average clays since publication may be 3.33 days. The inverse of Average clays since publication may be taken because content objects with more recent publication dates more relevant to users or the trending topic than content objects with more recent publication dates. As an example and not by way of limitation, a first cluster comprising content objects with an average of 8 days since publication may receive a quality score of 0.125, and a second cluster comprising content objects with an average of 2 days since publication may receive a quality score of 0.50. Although this disclosure describes calculating particular quality scores for clusters in a particular manner, this disclosure contemplates calculating any suitable quality scores for clusters in any suitable manner.

In particular embodiments, the quality score for each cluster may be based at least on a number of content objects within the cluster. The number of content objects in a cluster may affect the quality score of the cluster by raising the quality score of the cluster as the number of content objects within the cluster increases. The number of content objects in a cluster may reflect the amount of people who are talking about a sub-topic associated with the cluster on the online social network, which may in turn indicate how important users find the particular sub-topic. When determining the number of content objects within a cluster, the social-networking system 160 may consider the amount of times a particular article has been posted or shared by users of the online social network. As an example and not by way of limitation, multiple users may share the same video of a dolphin at SEAWORLD jumping out of the water and snatching a woman's iPad out of her hands. Even though the same content object has been shared multiple times, the social-networking system 160 may account for every share of this video as increasing the quality score of the cluster comprising this video. Although this disclosure describes calculating a quality score for each cluster in a particular manner, this disclosure contemplates calculating a quality score for each cluster in any suitable manner.

In particular embodiments, the quality score for each cluster may be based at least on a measure of coherence of content objects within the cluster. The measure of coherence may indicate how unified, similar, or related the content objects are to one another. A way to measure document similarity may be to transform the documents into vector representing the documents, then compute the cosine similarity between them. Using, for example, a word2vec, each content object may be converted into a vector. A set of content objects (e.g., all the content objects within a particular cluster) may be viewed as a set of vectors in a vector space. Then the similarity between content objects may be determined by calculating the cosine similarity of their vector representations. As an example and not by way of limitation, the cosine similarity of two content objects $d_1$ and $d_2$ that have been converted to vectors $V(d_1)$ and $V(d_2)$ may be calculated by applying the following formula:

$$sim(d_1, d_2) = \frac{V(d_1) \cdot V(d_2)}{|V(d_1)||V(d_2)|}$$

where the numerator may represent the dot product (e.g., inner product) of the vectors $V(d_1)$ and $V(d_2)$ and the denominator may represent the product of their Euclidean lengths. This analysis may be applied to text documents, videos whose audio has been transcribed either manually or automatically, or images that have been described in text either manually or automatically. Alternatively or in addition, the social-networking system 160 may apply the above analysis to captions for videos and photos. The measure of coherence may be determined by cosine similarity. In connection with using embeddings in relation to trending topics, particular embodiments may utilize one or more systems, components, elements, functions, methods, operations, or steps disclosed in U.S. patent application Ser. No. 15/286,315, titled "Search Ranking and Recommendations for Online Social Networks based on Reconstructed Embeddings" filed 5 Oct. 2016, which is incorporated by reference. Although this disclosure describes calculating a quality score for each cluster in a particular manner, this disclosure contemplates calculating a quality score for each cluster in any suitable manner.

In particular embodiments, the quality score for each cluster may be based at least on a measure of relevance of the content objects within the cluster to the trending topic or to sub-topic associated with that cluster. The measure of relevance may be calculated by a vector-space model that measures a similarity between a vector representation of each content object in the cluster and vector representation of the trending topic. When determining the measure of relevance of a particular content object within a cluster to the trending topic, the social-networking system 160 may analyze the content of the content object without accounting for the popularity of the content object (e.g., how many times it has been posted or shared on the online social network). Alternatively, the social-networking system 160 may consider both the content of the particular content object and its popularity on the online social network. One way to determine the measure of relevance for a given content object to its trending topic or sub-topic is to treat the trending topic or sub-topic as a search query, and apply information retrieval techniques to the content object (e.g., a vector-space model that measures a similarity between a vector representation of each content object in the cluster and vector representation of the trending topic). In particular embodiments, n-grams may be represented in a d-dimensional embedding space, where d denotes any suitable number of dimensions. In particular embodiments, an n-gram may be represented in the embedding space as a vector which may be referred to as a term embedding. Each vector may comprise coordinates corresponding to a particular point in the embedding space. An n-gram may be mapped to a respective vector representation. As an example and not by way of limitation, n-grams $t_1$ and $t_2$ may be mapped to vectors $\vec{v_1}$ and $\vec{v_2}$ in an embedding space, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in an embedding space. In particular embodiments, an n-gram may be mapped to a vector representation in an embedding space by using a deep-leaning model (e.g., a neural network). The deep-learning model may have been trained using a sequence of training data (e.g., a corpus of objects each comprising n-grams). In particular embodiments, objects may be mapped to an embedding in an embedding space. An embedding $\vec{\pi}(e)$ of object e may be based on one or more properties, attributes, or features of the object, relationships of the object with other objects, or any other suitable information associated with the object. As an example and not by way of limitation, an embedding $\vec{\pi}(e)$ of object e may be based on one or more n-grams associated with object e. In particular embodiments, an object may be mapped to a vector representation in an embedding space by using a deep-learning model. In particular embodiments, the social-networking system 160 may utilize one or more systems, components, elements, functions, methods, operations, or steps disclosed in U.S. patent application Ser. No. 14/949,436, filed 23 Nov. 2015, which is incorporated by reference. Although this disclosure describes representing an n-gram or an object in an embedding space in a particular manner, this disclosure contemplates representing an n-gram or an object in an embedding space in any suitable manner.

In particular embodiments, the social-networking system 160 may calculate a similarity metric of embeddings in embedding space 400. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \cdot \|\vec{v_2}\|}.$$

As another example and not by way of limitation, a similarity metric of $\vec{v_1}$ and $\vec{v_2}$ may be a Euclidean distance $\vec{v_2}$. A similarity metric of two embeddings may represent how similar the two objects corresponding to the two embeddings, respectively, are to one another, as measured by the distance between the two embeddings in the embedding space. As an example and not by way of limitation, a cosine similarity may be used to measure the angle between two vectors $\vec{v_1}$ and $\vec{v_2}$, which may represent one or more n-grams comprised in a content object within a cluster and one or more n-grams in a sub-topic, respectively. A small cosine similarity between $\vec{v_1}$ and $\vec{v_2}$ may indicate that the two vectors are similar. Thus, as cosine similarity decreases, relevance between the two documents represented by $\vec{v_1}$ and $\vec{v_2}$ may increase.

In particular embodiments, the measure of relevance may be based at least on an algebraic analysis. As an example and not by way of limitation, a sub-topic may be represented as a search query which states "Harper MVP." The two terms in this search query are "Harper" and "MVP." Three content objects A, B, and C may be included within a particular cluster. Each content object may be represented by a three-dimensional vector [x, y, z], where x represents the number of times a given term appears in a title or headline of a particular content object, y represents the number of times the given term appears in a description tag of the particular content object, and z represents the number of times the given term appears in the body text of the particular content object. As an example and not by way of limitation, content object A may be represented by the vector $V_A$=Harper[1, 1, 10]; MVP[1, 2, 13]. This may mean that in content object A, "Harper" appears once in the title, once in the description tag, and 10 times in the body text. The values in the vectors may be added together for each term and then multiplied by the sum of the values in each vector to determine the measure of relevancy for a given content object. As an example and not by way of limitation, suppose content objects A, B, and C have the following vector representations:

$V_A$=Harper[1,1,27];MVP[1,1,10]

$V_B$=Harper[1,0,7];MVP[0,0,5]

$V_C$=Harper[0,0,3];MVP[1,1,14]

The measure of relevance for each content object may be calculated as:

measure of relevance $(A)=(1+1+27)\times(1+1+10)=348$ measure of relevance $(B)=(1+0+7)\times(0+0+5)=40$ measure of relevancy $(C)=(0+0+3)\times(1+1+14)=48$.

Thus, content object A may have the highest measure of relevance to the subtopic "Harper MVP." The above analysis may be applied to measure how relevant content objects are to a given sub-topic, or to measure how relevant a given cluster is to a particular trending topic. To accomplish the latter, the social-networking system 160 may calculate the measure of relevance for terms in the trending topic instead of the sub-topic. Although this disclosure describes calculating a measure of relevance in a particular manner, this disclosure contemplates calculating a measure of relevance in any suitable manner.

In particular embodiments, the quality score for each cluster may be based at least on a proportion of content objects within the cluster that were published by verified publishers. A verified publisher may be a publisher that the social-networking system 160 trusts and has indicated as much by certifying the verified publisher. Verified publishers may include professional news organizations (e.g., CNN, ESPN, SLATE) that consistently publish professional or high-quality content. An example of an unverified publisher may be an individual user of the online social network. Individual users of the online social network may post content objects to the online social network, but they may not be verified publishers. If a high number of verified publishers post content objects related to a particular sub-topic as compared to other sub-topics, there may be more content objects from verified publishers in the cluster associated with the particular sub-topic than in clusters associated with other sub-topics. A higher number of content objects from verified publishers may correlate with a higher quality score. Although this disclosure describes calculating a quality score in a particular manner, this disclosure contemplates calculating a quality score in any suitable manner.

In particular embodiments, the social-networking system 160 may select the cluster with the highest quality score as a trending cluster. A trending cluster may be a cluster associated with a sub-topic that users of the online social network may find the most important at a given time for a given trending topic. As an example and not by way of limitation, the trending topic "Bryce Harper" may be associated with the following sub-topics: (1)"Bryce Harper is selected as the unanimous MVP," (2) "Bryce Harper gives his bat to a young fan," and (3) "Bryce Harper takes a selfie." Sub-topic (1) may have a quality score of 0.75; sub-topic (2) may have a quality score of 0.32; and sub-topic (3) may have a quality score of 0.17. Thus, because sub-topic (1) has the highest quality score, it may be selected as the trending cluster. Although this disclosure describes selecting a trending cluster in a particular manner, this disclosure contemplates selecting a trending cluster in any suitable manner.

In particular embodiments, the social-networking system 160 may generate a trending-topic interface comprising a headline, description, and image for the trending topic, wherein the headline, description, and image may be extracted from one or more of the content objects within the trending cluster. The trending-topic interface may be similar to the trending-topic interfaces discussed above with reference to FIG. 4A or FIG. 4B. The social-networking system 160 may identify a headline, description, and image from one or more content objects. The headline, description, and image may all come from the same content object or may come from different content objects. In particular embodiments, a video may also be included in the trending-topic interface in place of or in addition to the image. In particular embodiments, the social-networking system 160 may extract one or more text strings that appear in one or more content objects within the trending cluster, and generate the headline and description of the trending topic based on the extracted text strings. The identification of text strings for extraction may be based on identifying a headline of a content object within the trending cluster that has the most words in common with other headlines from content objects within the cluster. Thus, generating the headline of the trending topic may comprise comparing, for each extracted headline from each article of the one or more articles, the n-grams of the extracted headline with the n-grams of the extracted headline from each other article of the one or more articles, and selecting one of the extracted headlines as the headline of the trending topic based on the selected headline having more words in common with the extracted headlines from each other article than any of the extracted headlines from each other article have in common with each other. As an example and not by way of limitation, a particular cluster may have three articles with the following headlines: (1) "Bryce Harper National League MVP;" (2) "Bryce Harper Unanimous MVP;" and (3) "Bryce Harper is Youngest Unanimous MVP in National League." The third headline has the most words in common with the other two headlines in the cluster, so it may be selected as the trending headline. There are usually many more than three articles in a given cluster, but the analysis may be the same regardless of the size of the cluster. Other factors that may be considered when selecting an appropriate headline for extraction may include the length of the headline (e.g., the social-networking system 160 may filter out headlines that are longer than a threshold length), whether the text of the headline appears in posts, comments, or reshares by users of the online social network in association with the headline's article. Text of articles appearing in user-generated posts are explained in more detail in U.S. application Ser. No. 14/797,819, filed 13 Jul. 2015 and U.S. application Ser. No. 14/938,685, filed 11 Nov. 2015, which are incorporated herein by reference. Another factor that may be considered when selecting an appropriate headline, description, and image for extraction may be whether the publisher of the headline, description, or image is a verified publisher on the online social network (e.g., CNN may be a verified publisher but an independent blogger may not be verified). In particular embodiments, the social-networking system 160 may send the trending-topic interface to one or more client systems associated with one or more users of the online social network, respectively. This may enable the users to view and interact with the trending-topic interface. Although this disclosure describes generating a headline, description, and image in a particular manner, this disclosure contemplates generating a headline, description, and image in any suitable manner.

In particular embodiments, the social-networking system 160 may also generate a summary of the sub-topic associated with the trending cluster. The summary may be a compilation of excerpts that have been extracted from one or more articles within the trending cluster. This may be accomplished by using a similar method as that used for headline extraction, discussed above. In particular embodiments, the summary may be generated by analyzing shares and posts of particular articles within the trending cluster. As an example and not by way of limitation, users of the online social network may read an article that was posted on the online social network or on the Internet outside the online social network, and the users may post or share that article on the online social network. The users may additionally post a quote in conjunction with posting or sharing the article. As an example and not by way of limitation, a user may post a link to an article about Bryce Harper winning the MVP, and also include in the post the following quote from the article: "Harper has brought more than just extra flair to the game. He continues to showcase that he's one of the best players in the game." The social-networking system 160 may aggregate all the posts of a particular article or group of articles (e.g., all or some of the articles in a cluster), and determine which quotes users have posted most often in conjunction with the article or articles. The social-networking system 160 may compile the most popular quotes and generate a summary of the article using the quotes that users have posted in conjunction with the article. In particular embodiments, the social-networking system 160 may select one or more posts or quotes to form the component parts of the summary of sub-topic associated with the trending cluster. More information about generating summaries of subtopics (e.g., news events) and determining which aspects may be most interesting to users may be found in U.S. application Ser. No. 14/616,155, filed 6 Feb. 2015, and in U.S. application Ser. No. 15/014,895, filed 3 Feb. 2016, which are incorporated herein by reference.

Figure 6:
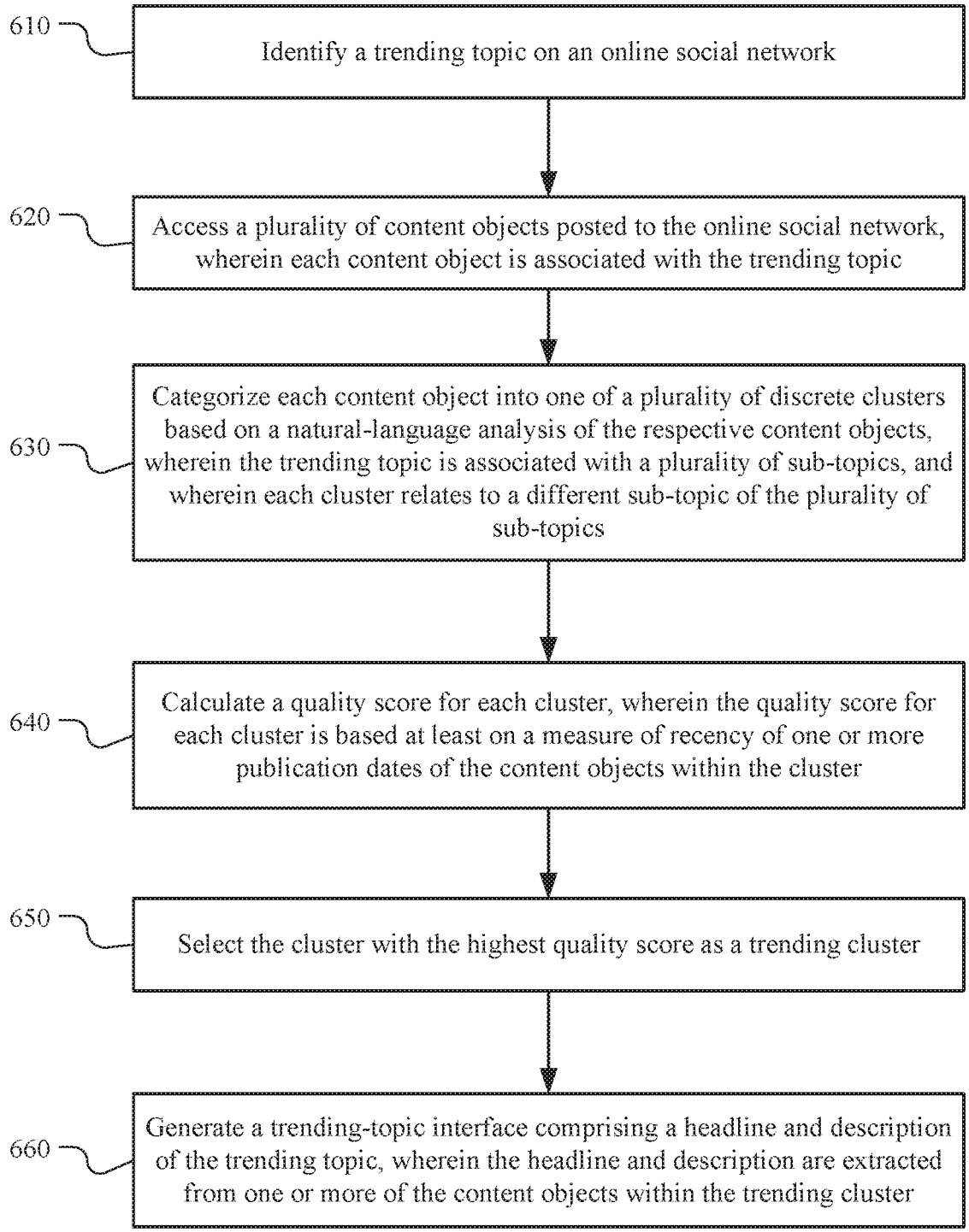
FIG. 6 illustrates an example method for generating a trending-topic interface for a trending topic on an online social network.

FIG. 6 illustrates an example method 600 for generating a trending-topic interface for a trending topic on an online social network. The method may begin at step 610, where the social-networking system 160 may identify a trending topic on an online social network. At step 620, the social-networking system 160 may access a plurality of content objects posted to the online social network, wherein each content object is associated with the trending topic. At step 630, the social-networking system 160 may categorize each content object into one of a plurality of discrete clusters based on a natural-language analysis of the respective content objects, wherein the trending topic is associated with a plurality of sub-topics, and wherein each cluster relates to a different sub-topic of the plurality of sub-topics. At step 640, the social-networking system 160 may calculate a quality score for each cluster, wherein the quality score for each cluster is based at least on a measure of recency of one or more publication dates of the content objects within the cluster. At step 650, the social-networking system 160 may select the cluster with the highest quality score as a trending cluster. At step 660, the social-networking system 160 may generate a trending-topic interface comprising a headline and description of the trending topic, wherein the headline and description are extracted from one or more of the content objects within the trending cluster. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating a trending-topic interface for a trending topic on an online social network including the particular steps of the method of FIG. 6, this disclosure contemplates any suitable method for generating a trending-topic interface for a trending topic on an online social network including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
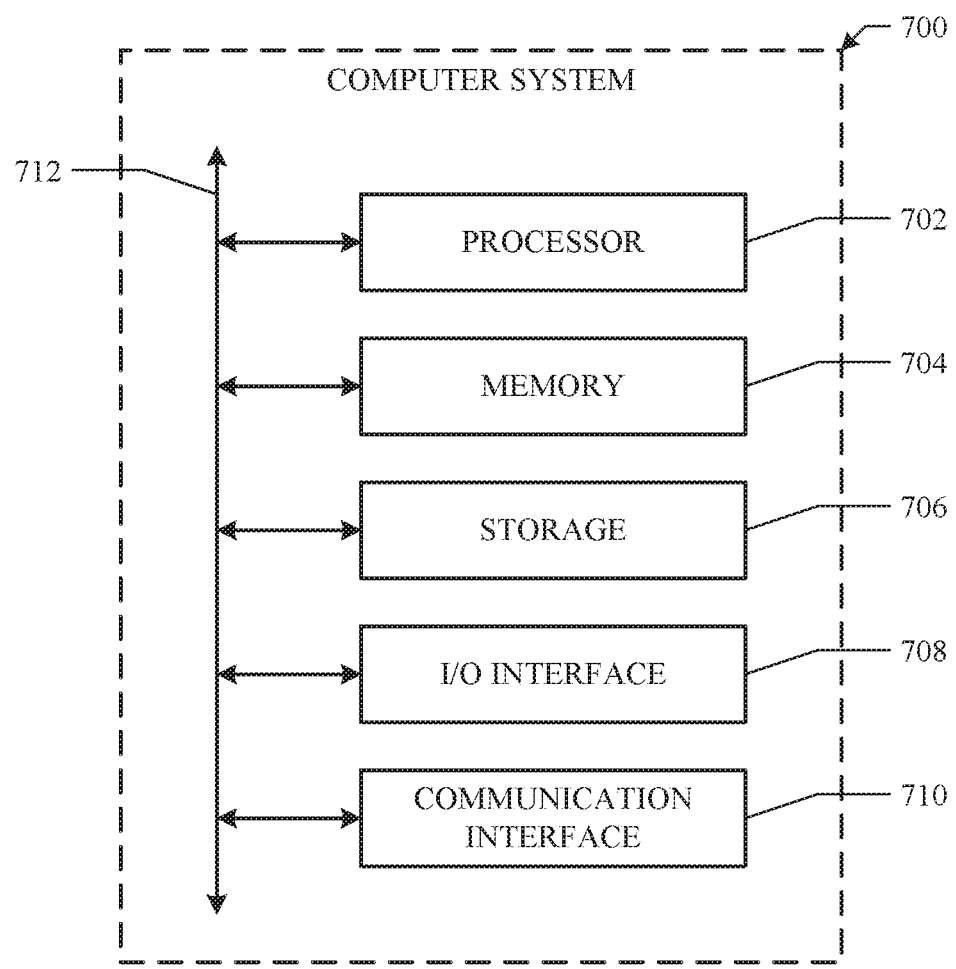
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
identifying a trending topic on an online social network;
accessing a plurality of content objects posted to the online social network, wherein each content object is associated with the trending topic;
categorizing each content object into one of a plurality of discrete clusters based on a natural-language analysis of the respective content objects, wherein the natural-language analysis is a term frequency-inverse document frequency (TF-IDF) analysis, wherein the trending topic is associated with a plurality of sub-topics, and wherein each cluster relates to a different sub-topic of the plurality of sub-topics;
calculating a quality score for each cluster, wherein the quality score for each cluster is based at least on a measure of recency of one or more publication dates of the content objects within the cluster;
selecting the cluster with the highest quality score as a trending cluster; and
generating a trending-topic interface comprising a headline and description of the trending topic, wherein the headline and description are each generated based on one or more text strings extracted from one or more of the content objects within the trending cluster.

2. The method of claim 1, further comprising sending the trending-topic interface to one or more client systems associated with one or more users of the online social network, respectively.

3. The method of claim 1, wherein the headline and description of the trending topic appears in a context module for the trending topic.

4. The method of claim 1, wherein each sub-topic is associated with an event that has occurred within a threshold timeframe.

5. The method of claim 1, wherein the quality score for each cluster is further based on a number of content objects within the cluster.

6. The method of claim 1, wherein the quality score for each cluster is further based on a measure of coherence of content objects within the cluster.

7. The method of claim 1, wherein the quality score for each cluster is further based on a measure of relevance of the content objects within the cluster to the trending topic, wherein the measure of relevance is calculated by a vector-space model that measures a similarity between a vector representation of each content object in the cluster and vector representation of the trending topic.

8. The method of claim 1, wherein the quality score for each cluster is further based on a proportion of content objects within the cluster that were published by verified publishers.

9. The method of claim 1, wherein the plurality of content objects comprises one or more articles.

10. The method of claim 1, wherein the plurality of content objects comprises one or more user-generated posts.

11. The method of claim 1, wherein the trending-topic interface further comprises one or more images associated with the trending topic, wherein the one or more images are extracted from one or more of the content objects within the trending cluster.

12. The method of claim 1, further comprising:
composing the headline and description from one or more of the content objects within the trending cluster.

13. The method of claim 12, wherein composing the headline and description comprises:
extracting one or more text strings selected from one or more content objects within the trending cluster; and
generating the headline and description of the trending topic based on the extracted text strings.

14. The method of claim 13, wherein the extracted text strings have appeared in a number of user-generated posts above a threshold number of user-generated posts.

15. The method of claim 13, wherein the content objects comprise one or more articles posted on the online social network, and wherein the extracted text strings are headlines from the articles.

16. The method of claim 15, wherein generating the headline of the trending topic comprises:
comparing, for each extracted headline from each article of the one or more articles, n-grams of the extracted headline with n-grams of the extracted headline from each other article of the one or more articles; and
selecting one of the extracted headlines as the headline of the trending topic based on the selected headline having more words in common with the extracted headlines from each other article than any of the extracted headlines from each other article have in common with each other.

17. The method of claim 1, wherein the headline is generated based on a comparison of a text string extracted from each content object of the one or more of the content objects within the trending cluster with a text string extracted from each other content object of the one or more of the content objects within the trending cluster.

18. One or more computer-readable non-transitory storage media embodying software that is operable when executed to:
identify a trending topic on an online social network;
access a plurality of content objects posted to the online social network, wherein each content object is associated with the trending topic;
categorize each content object into one of a plurality of discrete clusters based on a natural-language analysis of the respective content objects, wherein the natural-language analysis is a term frequency-inverse document frequency (TF-IDF) analysis, wherein the trending topic is associated with a plurality of sub-topics, and wherein each cluster relates to a different sub-topic of the plurality of sub-topics;
calculate a quality score for each cluster, wherein the quality score for each cluster is based at least on a measure of recency of one or more publication dates of the content objects within the cluster;

select the cluster with the highest quality score as a trending cluster; and generate a trending-topic interface comprising a headline and description of the trending topic, wherein the headline and description are each generated based on one or more text strings extracted from one or more of the content objects within the trending cluster.

19. A system comprising: one or more processors; and a non-transitory memory coupled to the processors comprising instructions executable by the processors, the processors operable when executing the instructions to:

identify a trending topic on an online social network;

access a plurality of content objects posted to the online social network, wherein each content object is associated with the trending topic;

categorize each content object into one of a plurality of discrete clusters based on a natural-language analysis of the respective content objects, wherein the natural-language analysis is a term frequency-inverse document frequency (TF-IDF) analysis, wherein the trending topic is associated with a plurality of sub-topics, and wherein each cluster relates to a different sub-topic of the plurality of sub-topics;

calculate a quality score for each cluster, wherein the quality score for each cluster is based at least on a measure of recency of one or more publication dates of the content objects within the cluster;

select the cluster with the highest quality score as a trending cluster; and generate a trending-topic interface comprising a headline and description of the trending topic, wherein the headline and description are each generated based on one or more text strings extracted from one or more of the content objects within the trending cluster.

* * * * *